United States Patent [19]
Sato

[11] Patent Number: 5,055,027
[45] Date of Patent: Oct. 8, 1991

[54] SCREW TYPE EXTRUDING APPARATUS
[75] Inventor: Takuya Sato, Suita, Japan
[73] Assignee: Sato Iron Works Co., Ltd., Higashiosaka, Japan
[21] Appl. No.: 403,616
[22] Filed: Sep. 6, 1989
[30] Foreign Application Priority Data Jul. 12, 1989 [JP] Japan ................... 1-180064

[51] Int. Cl.$^5$ .............................. B29C 47/38
[52] U.S. Cl. ..................... 425/197; 264/211.21; 264/211.23; 366/82; 425/199; 425/204; 425/208
[58] Field of Search ............... 425/208, 204, 197, 198, 425/199; 264/211.21, 211.23; 366/82, 81, 78

[56] References Cited
U.S. PATENT DOCUMENTS
4,510,110 4/1985 Mazzoni ..................... 425/208 X FOREIGN PATENT DOCUMENTS
901151 1/1954 Fed. Rep. of Germany ........ 366/82
562152 5/1957 Italy ................................ 366/82
6051024 4/1985 Japan.
62-148233 7/1987 Japan.

Primary Examiner—Richard L. Chiesa
Attorney, Agent, or Firm—Felfe & Lynch

[57] ABSTRACT

An extruding apparatus having a reservoir for reserving a treatment-object material including a main raw material, additives or auxiliary materials, a screw disposed within a material-conveying passage and for conveying the material to a terminal end, and an extruding die disposed at the terminal end and for extruding the material into a predetermined shape. The material-conveying passage includes a pair of discs disposed at intermediate positions in the conveying direction of the screw and opposed to each other transverse relative to the passage. Each of the discs defines a plurality of slit pores extending in the material conveying direction, with one disc being operatively coupled with the screw to be rotatable relative to the other disc. The disc pair constitutues a milling-kneading mechanism for milling and kneading the material by causing the material to pass through the slit pores formed by the disc pair.

6 Claims, 5 Drawing Sheets

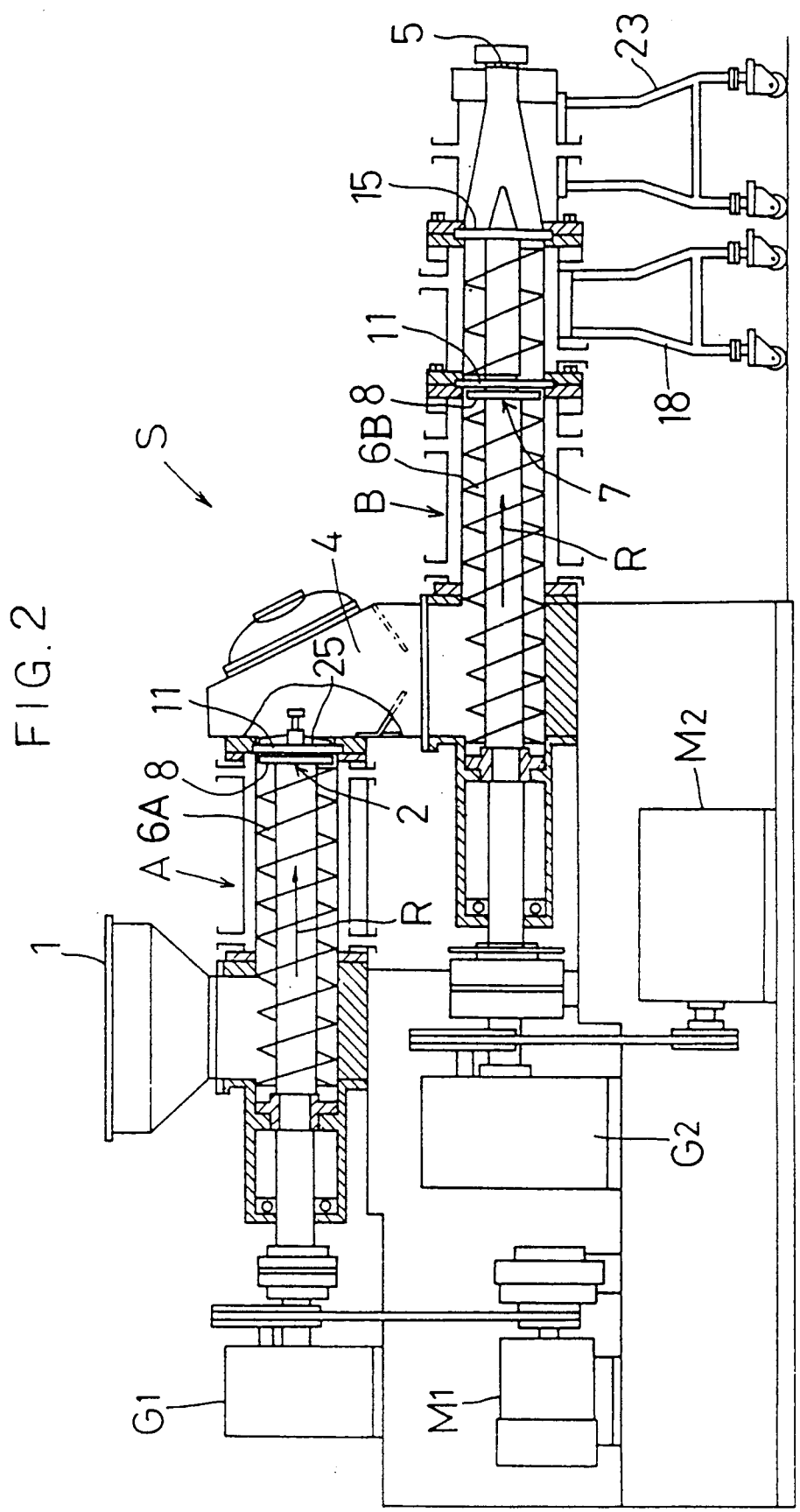

SCREW TYPE EXTRUDING APPARATUS

BACKGROUND OF THE INVENTION

1. Field of the Invention

The present invention relates to a screw type extruding apparatus for extruding a treatment-object material including a main raw material mixed and kneaded together with an additive or auxiliary material.

2. Description of the Related Arts

A conventional extruding apparatus S' of the above-noted type includes, as shown in FIG. 8, a reservoir 1 for reserving the treatment-object material, a screw 6 for forcibly conveying the material from the reservoir 1 to an extruding die placed at a terminal end of the apparatus and a fixed multi-pore plate 15 defining a plurality of through pores in the screw axis direction and interposed between the extruding die 5 and the screw 6.

With the above extruding apparatus, the treatment-object material including the main raw material mixed and kneaded with an additive or the like such as a perfume while conveying the same by means of the screw. In the next manufacturing step, the extruded material is cut into predetermined dimensions or marked to be final products. The quality of this final product depends significantly on the homogeneity in the quality of the material extruded by the extruding apparatus.

Then, if the homogeneity alone is to be improved, such improved homogeneity may be achieved simply by subjecting the material to a greater number of kneading steps before introducing the same into the reservoir of the apparatus. However, the increased number of kneading steps necessitate an enlargement in the device specially adapted for the multi kneading steps, thereby imposing disadvantages in the installment and running costs and also in the installment space of the extruding apparatus.

In view of the above-described state of the art, the primary object of the present invention is to provide an improved extruding apparatus which can provide an extruded material with a higher homogeneity by ingeniously coupling the conveyor screw with kneading means and which is advantageous in the installment and running costs and in the installment space while eliminating partially or entirely the large special sub-system for assisting the kneading of the material.

SUMMARY OF THE INVENTION

In order to accomplish the above-described object, a screw type extruding apparatus according to the present invention comprises: a reservoir for reserving a treatment-object material including a main raw material, additives or auxiliary materials; screw means disposed within a material-conveying passage and for conveying the material to a terminal end; and an extruding die disposed at the terminal end and for extruding the material into a predetermined shape; wherein the material-conveying passage includes a pair of discs disposed at intermediate positions in the conveying direction of the screw means and opposed to each other transverse relative to the passage, each of the discs defining a plurality of slit pores extending in the material conveying direction, one disc being opertively coupled with the screw means to be rotatable relative to the other disc, the disc pair constituting a milling-kneading mechanism for milling and kneading the material by causing the material to pass through the slit pores formed by the disc pair.

With the above construction in operation, as the material being conveyed by the screw means passes through the milling-kneading mechanism, the material is forcibly pressed into the pores of the rotating disc and then milled and kneaded through the relative rotation between the disc pair. Then, this milled and kneaded material is continuously conveyed by the screw further to the terminal end of the extruding apparatus where the extruding die is located.

That is to say, the material, which is being conveyed by the screw, is subjected to the strong and effective kneading effect from the relative rotation between the disc pair. On the other hand, such screw conveying system necessarily has a slight radial clearance between the screw blade and the inner wall of the cylindrical housing accommodating the screw means so as to permit the free rotation of the screw means therein. Because of this radial clearance, conventionally there tends to occur a reverse flow of a part of the material being forcibly conveyed by the rotating screw. This reverse flow disadvantageously lowers the pressure needed at the extruding die or deteriorates the conveying efficiency of the extruding apparatus. However, the milling-kneading mechanism constituted by the disc pairs of the invention effectively prevents such reverse material flow by acting as resistance against the reverse flow. That is to say, the milling-kneading mechanism contributes not only to the improvement of homogeneity of the material but to the conveying efficiency of the same.

Moreover, since the screw means originally adapted for conveying the material is effectively utilized also as feeding means for feeding the material to the milling-kneading mechanism as the kneading means, the kneading means may be incorporated within the extruding apparatus per se without entailing further installment and running costs. Moreover, since the screw means acts both for conveying and milling-kneading the material, the entire apparatus cost may be reduced also.

Further and other objects, features and effects of the invention will become apparent from the following more detailed description of the embodiments of the invention with reference to the accompanying drawings.

BRIEF DESCRIPTION OF THE DRAWINGS

Accompanying drawings: FIGS. 1 through 7 illustrate preferred embodiments of a screw type extruding apparatus related to the present invention; in which, FIG. 1 is a sectional side view showing a rear portion of a lower-stage screw of the apparatus, FIG. 2 is a partially cutaway side view of the entire apparatus, FIG. 3 is a partially cutaway front view showing a construction of milling-kneading mechanism, FIG. 4 is a rear view showing a cutter portion of a rear end of an upper-stage screw, FIG. 5 is a view illustrating a part of manufacturing steps, and FIGS. 6 and 7 are respectively a partially cutaway side view and a front view of extruding apparatus according to alternate embodiments of the invention.

DESCRIPTION OF THE PREFERRED EMBODIMENTS

Preferred embodiments of a screw type extruding apparatus, which is particularly adapted in these embodiments for extruding a soap material, relating to the present invention will be particularly described hereinafter with reference to the accompanying drawings.

Figure 5:
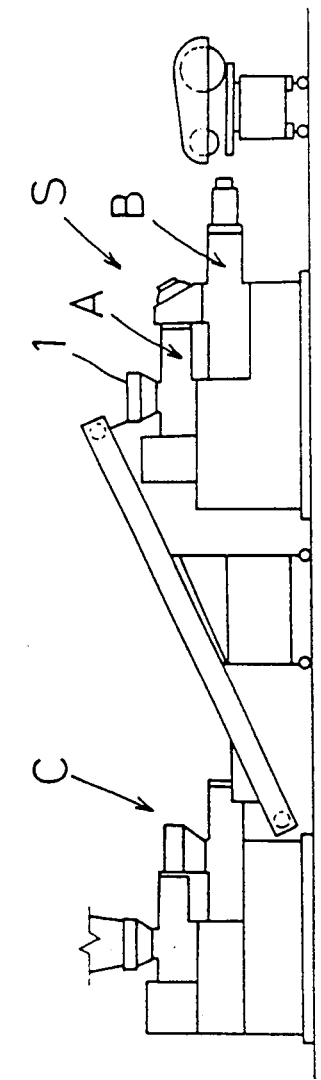

The screw type extruding apparatus, which is denoted generally at a reference mark S, of the invention, as shown in FIG. 2, includes screw means 6 consisting, in this embodiment, of an upper-stage screw 6A and a lower-stage screw 6B, reservoirs 1 and 4 disposed respectively at the starting end of the upper-stage screw 6A and between this upper-stage screw 6A and the lower-stage screw 6B, and an extruding die 5 disposed at the terminal end of the lower-stage screw 6B. The upper-stage and lower-stage screws 6A and 6B are rotatably driven by means of motors M1 and M2 via e.g. speed-reducing units G1 and G2, respectively. This extruding apparatus S, as illustrated in FIG. 5, is installed continuously with an upper-lower, two-stage mixer C for mixing and kneading soap material in the form of pellets added with a coloring material or perfume conveyed from a preceding manufacturing step. An upper-stage screw device A, which constitutes a treatment-object material passage R together with a lower-stage screw device B, includes the upper-stage screw 6A for conveying the soap material fed through the reservoir 1 at the starting end from the mixer C to the further reservoir 4 disposed between the upper-stage screw device A and the lower-stage screw device B. Further, at the terminal end of this upper-stage screw 6A, there is provided a first milling-kneading mechanism 2 for applying a milling-kneading effect to the conveyed material.

Figure 1:
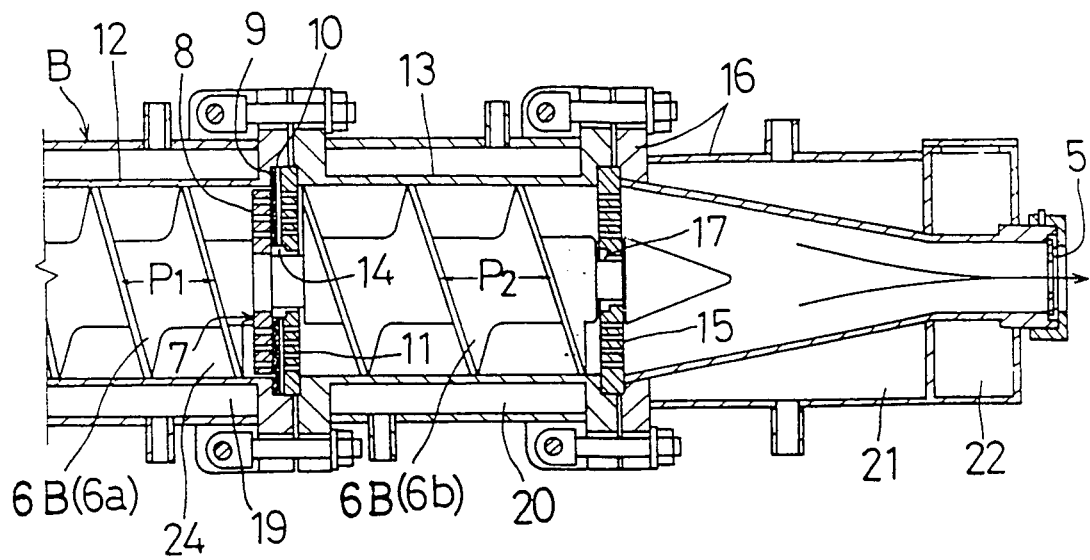
Figure 3:
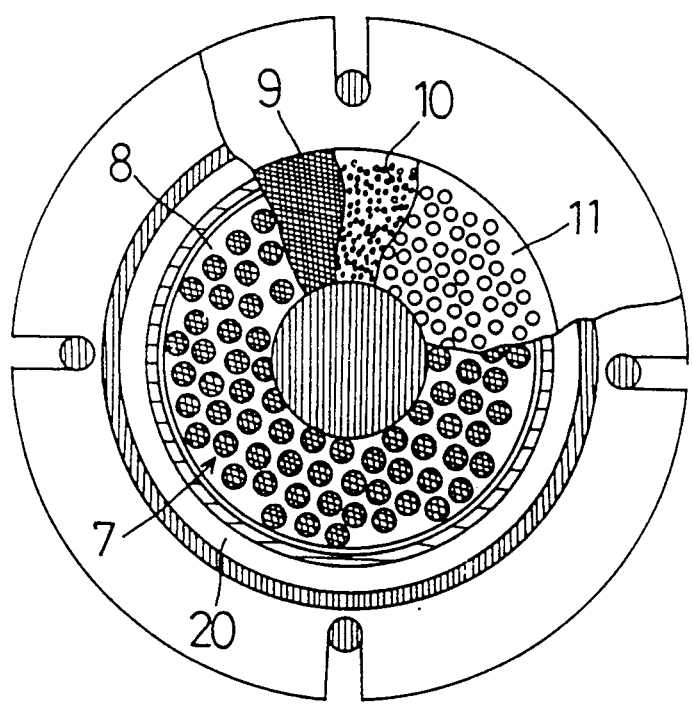

On the other hand, the lower-stage screw device B includes the lower-stage screw 6B for conveying the soap material through the reservoir 4 to the extruding die 5 disposed at the terminal end of the extruding apparatus S. Also, at an intermediate position in this lower-stage screw 6B, there is provided a second milling-kneading mechanism 7 constructionally identical with the first milling-kneading mechanism 2, with the second milling-kneading mechanism 7 transversing the conveying passage R. The intermediate reservoir 4 is connected with an unillustrated vacuum pump via a pipe so as to eliminate air which may exist in the intermediate material fed from the upper-stage screw device A. Next, the constructionally identical first and second milling-kneading mechanisms 2 and 7 will be described by taking the second mechanism 7 for example. This second milling-kneading mechanism 7, as illustrated in FIGS. 1 and 3, includes a rotary disc 8 rotatable in unison with the lower-stage screw 6B and defining a plurality of slit pores extending in the screw axis direction and a fixed disc 11 fixedly disposed in the downstream of and in opposition to the rotary disc 8, the fixed disc 11 defining a plurality of slit pores in the screw axis direction also. The shape of the slit pores defined in these discs 8 and 11 is not limited to the illustrated one as the straight cylinder formed in parallel with the material converying direction. For instance, the slit pores of the fixed disc 11 may extend to some extent in the disc thickness in the material conveying direction or extend along the rotational direction of the rotary disc 8. These alternate arrangements are advantageous for appropriately reducing the resistance occuring in the conveyor of the material.

Further, the second milling-kneading mechanism 7 includes, in between the rotary and fixed discs 8 and 11, a mesh disc 9 for filtering the soap material and a punching plate 10 defining a plurality of through pores which are smaller than those of the fixed disc 11. The punching plate 10 serves to reinforce the mesh disc 9, i.e. to protect the disc 9 from distortions; whereas the punching plate 10 is in turn reinforced by the fixed disc 11. Further, the lower-stage screw 6B of the lower-stage screw device B is divided into a front screw portion 6a and a rear screw portion 6b which are rotatable in unison. The fixed disc 11 of this lower-stage screw device B is fixedly positioned through a connection between a front cylinder 12 accommodating the front screw portion 6a and a rear cylinder 13 accommodating the rear screw portion 6b, while the disc 11 rotatably supports the rear screw portion 6b via a bearing 14. At a terminal end of this rear screw portion 6b, there is provided a fixed multi-pore plate 15 which is constructionally indentical to the fixed disc 11. This multi-pore plate 15, as illustrated in FIG. 1, is fixedly held between the rear cylinder 13 and an extruding die cylinder 16 pivotably supported to the rear cylinder 13 so as to act as a lid for opening and closing the same. Also, this fixed multi-pore plate 15 rotatably supports the rear screw portion 6b via a bearing 17. Furthermore, in the lower-stage screw 6B, the front screw portion 6a has a pitch P1 which is smaller than a pitch P2 of the rear screw portion 6b, such that the rear screw portion 6b may provide a greater material-conveying speed than the front screw portion 6a. Accordingly, the interior of the rear cylinder 13 at the position immediately after the second milling-kneading mechanism 7 is slightly depressurized. Then, as the material proceeds further downstream, there is applied a gradually increasing pressure on the material because of the effect of the larger pitch P2, thereby to increase the density of this material. This condensed material is caused to pass through the fixed multi-pore plate 15 to be finally fed to the extruding die 5.

Incidentally, a reference numeral 18 in FIG. 2 denotes a mount for supporting the rear cylinder 13, while numerals 19 and 20 in FIG. 1 denote cooling-water passages, respectively. The extruding die 5 disposed at the terminal end of the lower-stage screw device B has a conical extruding passage. The extruding die cylinder 16 is connected with the rear cylinder through a connecting arrangement which is identical to that between the rear cylinder 13 and the front cylinder 12. Further, numerals 21 and 22 in FIG. 1 denote heating or cooling-water passages. Numeral 23 in FIG. 2 denotes a mount for supporting the extruding die cylinder 16.

Next, functions of the extruding apparatus having the above-described construction will be detailed. First, the soap material fed from the reservoir 1 is conveyed by the upper-stage screw 6A and is forcibly milled and kneaded through the first milling-kneading mechanism 2 to be dropped into the intermediate reservoir 4. At this intermediate reservoir 4, the material has its air content eliminated as described hereinbefore. Then, this material is further conveyed on the front screw portion 6a of the lower-stage screw 6B to the second milling-kneading mechanism 7 to be milled and kneaded by the same again. As this twice milled and kneaded material passes through the fixed multi-pore plate 15, the material is rectified in its flow condition. Then, this conditioned material is finally extruded through the extruding die 5 into a continuous material having a predetermined cross section.

Figure 4:
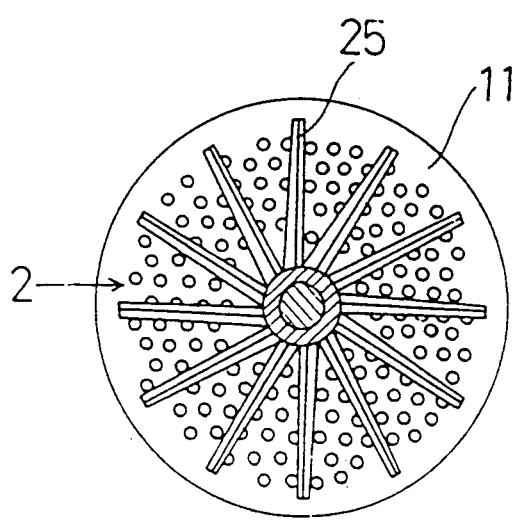

Incidentally, a reference numeral 25 denotes a rotary cutter for cutting the bar-shaped soap material having passed the first milling-kneading mechanism 2 into pellets (see FIG. 4). In the construction of this embodiment, because of the intermediate reservoir 4 which temporarily reserving the material before feeding the same to the lower-stage screw device B, this lower-stage screw device B may constantly operate in a stable and continous manner even if there occurs a variation in the per-unit-time amount of the soap material introduced into the reservoir 1.

According to the construction of this embodiment where the extruding apparatus consists of the upper and lower two stages of screw devices A and B and the respective devices A and B include the milling-kneading mechanisms 2 and 7, it becomes possible to significantly improve the kneading condition, i.e. homogeneity of the soap material, whereby some parts or the entire mixer C used in the preceding manufacturing step may be eliminated and the entire system costs may be reduced. Moreover, in the lower-stage screw device B, there is provided a slight and appropriate clearance between the outer diameter of the front screw portion 6a and the inner diameter of the front cylinder 12. This clearance may be inadvertently increased through an extended use. However, if such inadvertent clearance increase should occur, the milling-kneading mechanism can effectively prevent reverse flow phenomenon of the material associated therewith at the downstream screw portion. In the above embodiment, the milling-kneading mechanisms 2 and 7 each consists of the combination of the rotary disc 8 and the fixed disc 11. Instead, the mechanism 2, 7 includes, in combination with the rotary disc rotatable in unison with the screw 6, a further rotary disc which rotates in the same or opposite direction at a differentiated rotational speed.

Also, the apparatus of the invention may be used also for treating any viscous material other than the soap material employed in the previous embodiment.

Alternate Embodiments

Some alternate embodiments of the present invention will be specifically described next.

Figure 6:
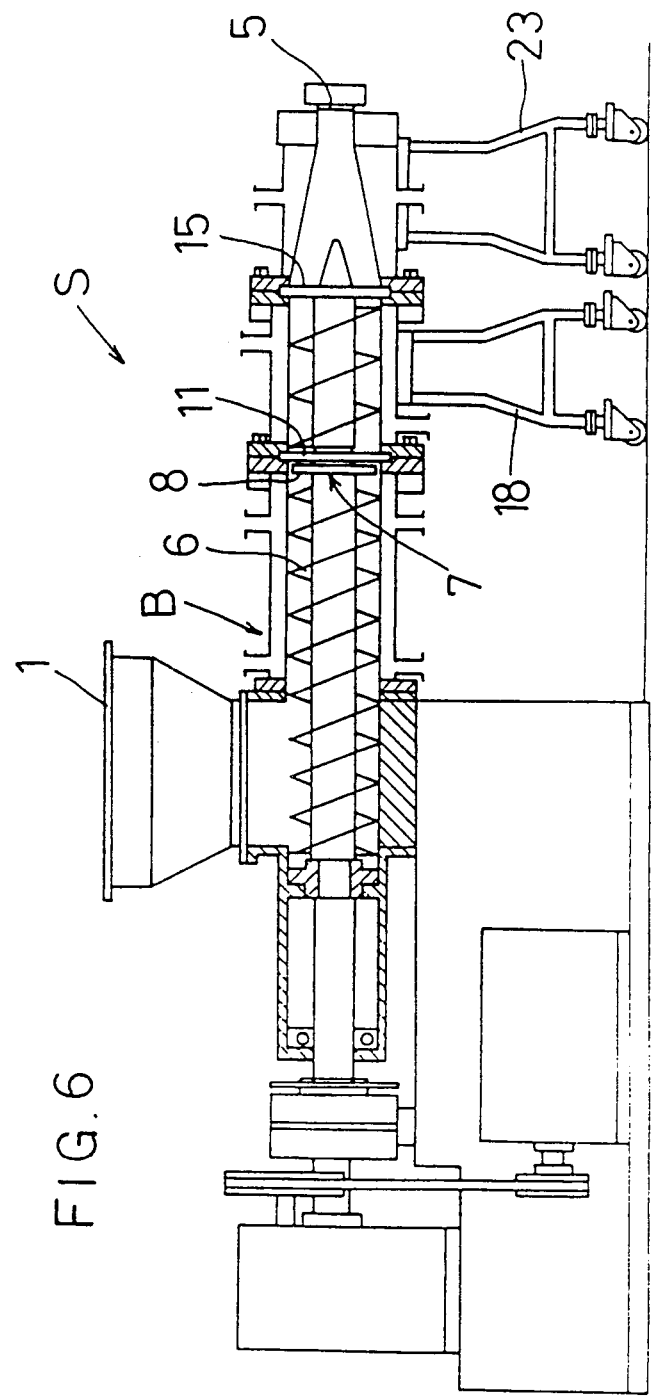
Figure 8:
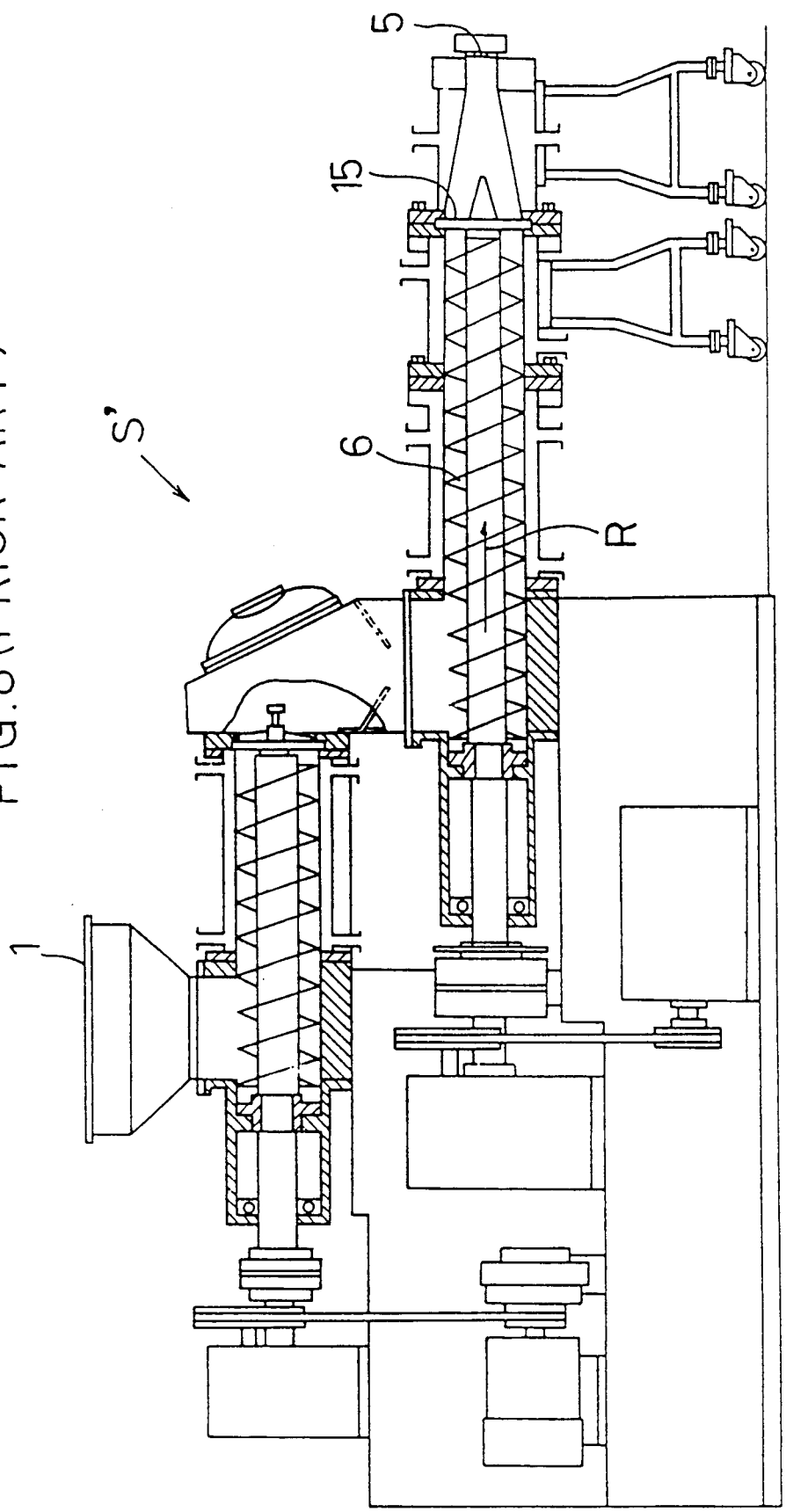
FIG. 8 is a partially cutaway side view showing an entire extruding apparatus of the prior art.

(1) As shown in FIG. 6, the extruding apparatus S may comprise a single-stage screw device B having the screw means 6 for conveying the material from the reservoir 1 to the extruding die 5 at the terminal end and the milling-kneading mechanism 7 provided at an intermediate position on the screw means 6.

Figure 7:
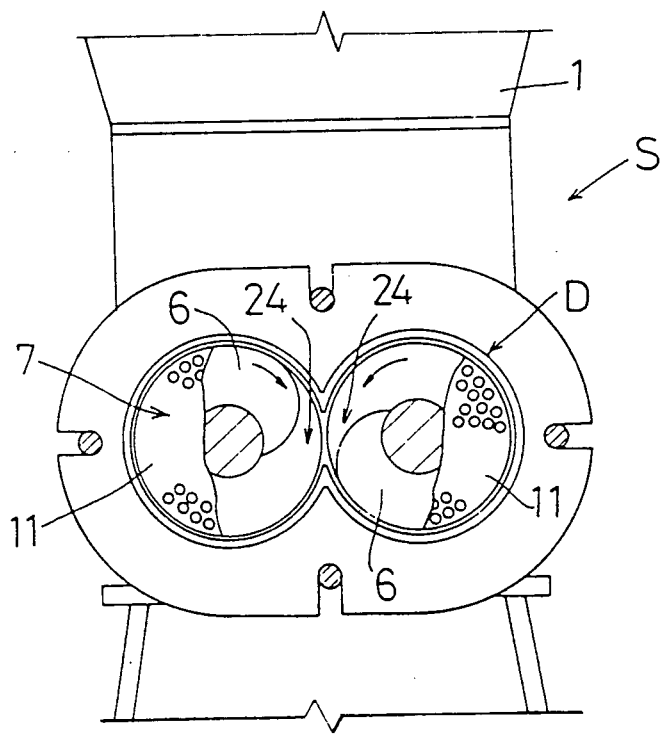

(2) As shown in FIG. 7, the extruding apparatus S may comprise a two-parallel-shaft screw device D consisting of a horizontally aligned pair of screws 6, 6. In this case, in order to facilitate the feeding of the material from the reservoir 1, these screws 6 and 6 are rotatably driven in the opposite mutually inward directions as indicated by arrows in FIG. 7, and material-conveying passages 24 and 24 accommodating the respective screws 6 and 6 are communicated with each other, with the milling-kneading mechanism 7 being provided between the passages 24 and 24.

More particularly, there are provided the pair of horizontally aligned screws 6 and 6 for conveying the material from the reservoir 1 to the extruding die 5. These screws 6 and 6 are rotatably driven in the opposite and mutually inward directions and the passages 24 and 24 accommodating the respective screws 6 and 6 are communicated with each other. Further, at an intermediate position on each screw 6, 6, there is provided the milling-kneading mechanism 7 consisting of the rotary disc 8 rotatable in unison with the screw 6 and defining a plurality of slit pores extending in the screw axis direction and the fixed disc 11 fixedly disposed in the downstream of and in opposition to the rotary disc 8, the fixed disc 11 defining a plurality of slit pores in the screw axis direction also.

The above alternate construction is advantageous for further improving the material conveying efficiency.

(3) The first milling-kneading mechanism 2 provided at the terminal end of the upper-stage screw 6A may be replaced by the fixed multi-pore plate 15.

What is claimed is:

1. A screw type extruding apparatus comprising:
   a reservoir for reserving a treatment-object material including a main raw material, additives or auxiliary materials;
   screw means disposed within a material-conveying passage and for conveying the material to a terminal end; and
   an extruding die disposed at the terminal end and for extruding the material into a predetermined shape;
   wherein said material-conveying passage includes a pair of discs disposed at intermediate positions in the conveying direction of said screw means and opposed to each other transverse relative to said passage,
   each of said discs defining a plurality of slit pores extending in the material conveying direction,
   one disc being operatively coupled with said screw means to be rotatable relative to the other disc,
   said disc pair defining milling-kneading mechanisms for milling and kneading the material by causing the material to pass through said slit pores formed by the disc pair, and
   a mesh disc and a punching plate having a plurality of pores and for reinforcing said mesh disc being interposed between said disc pair of the milling-kneading mechanisms.

2. An extruding apparatus as defined in claim 1, wherein said screw means includes an upper-stage screw and a lower-stage screw, each said screw including said milling-kneading mechanism.

3. An extruding apparatus as defined in claim 2, wherein a further reservoir is provided at a terminal end of said upper-stage screw so as to feed the material therethrough to said lower-stage screw.

4. An extruding apparatus as defined in claim 1, wherein said screw means defines a single-stage screw device.

5. An extruding apparatus as defined in claim 1, wherein said screw means includes a pair of horizontally aligned screws positioned within respective material-conveying passages communicated with each other, thereby said screw means defining a two-parallel-shaft screw device.

6. An extruding apparatus as defined in claim 5, wherein said pair of horizontally aligned screws are rotatably driven in opposite inward directions to trap the material therebetween in the upward-to-downward direction.

* * * * *